US012325245B2

(12) United States Patent
Katahira

(10) Patent No.: US 12,325,245 B2
(45) Date of Patent: Jun. 10, 2025

(54) INFORMATION PROCESSING APPARATUS AND NOTIFICATION METHOD

(71) Applicant: CANON KABUSHIKI KAISHA, Tokyo (JP)

(72) Inventor: Yuka Katahira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 18/148,366

(22) Filed: Dec. 29, 2022

(65) Prior Publication Data

US 2023/0144277 A1 May 11, 2023

Related U.S. Application Data

(63) Continuation of application No. 17/722,175, filed on Apr. 15, 2022, now Pat. No. 11,685,167, which is a continuation of application No. 16/909,750, filed on Jun. 23, 2020, now Pat. No. 11,331,928.

(30) Foreign Application Priority Data

Jun. 28, 2019 (JP) ................................ 2019-120952

(51) Int. Cl.

*B41J 2/175* (2006.01)
*B41J 2/045* (2006.01)
*B41J 29/13* (2006.01)

(52) U.S. Cl.

CPC .. *B41J 2/17566* (2013.01); *B41J 2002/17573* (2013.01)

(58) Field of Classification Search

CPC .... B41J 2/17566; B41J 2/04501; B41J 29/13; B41J 2002/17573

See application file for complete search history.

(56) References Cited

U.S. PATENT DOCUMENTS

2006/0164458 A1* 7/2006 Saikawa ................ B41J 15/042 347/19
2011/0242249 A1* 10/2011 Yazawa ................ B41J 2/17566 347/108
2014/0002517 A1* 1/2014 Naka .......................... B41J 2/45 347/5

FOREIGN PATENT DOCUMENTS

JP 2004188638 A * 7/2004

* cited by examiner

*Primary Examiner* — Jason S Uhlenhake

(74) *Attorney, Agent, or Firm* — Canon U.S.A., Inc. IP Division

(57) ABSTRACT

An information processing apparatus includes: a state detection unit configured to detect states of the liquids contained in the plurality of liquid tanks; a light emission unit attached to an external surface of the information processing apparatus with a cover closed, the cover being opened when the plurality of tanks are operated; and a control unit configured to control the light emission unit, based on a fact that the state of the liquid detected by the state detection unit is a predetermined state in one of the plurality of liquid tanks, so that the light emission unit emits light in a light emission pattern corresponding to the liquid tank that contains the liquid in the predetermined state, out of a plurality of light emission patterns corresponding to the plurality of liquid tanks.

16 Claims, 10 Drawing Sheets

FIG. 8

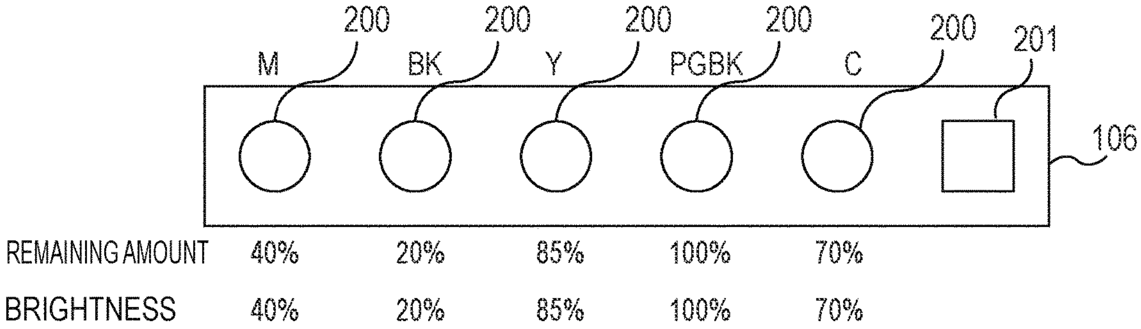

FIG. 9

| INDICATED STATUS | LIGHT EMISSION PATTERN |
|---|---|
| POWER-IS-ON INDICATION | LIGHTING OF WHITE LEDs SHIFTS FROM CENTER TOWARD LEFT AND RIGHT ENDS |
| POWER-IS-OFF INDICATION | LIGHTING OF WHITE LEDs SHIFTS FROM LEFT AND RIGHT ENDS TOWARD CENTER |
| FATAL ERROR INDICATION | ONE WHITE LED (LEFT END) AND ORANGE LED TOGGLE-BLINK (BY NUMBER OF TIMES WRITTEN IN ERROR LIST) |
| ERROR INDICATION | ORANGE LED BLINKS |
| NORMAL INDICATION | FIVE WHITE LEDs ARE LIT AT LOW BRIGHTNESS |
| BACKLIGHT OFF INDICATION | ONE WHITE LED (LEFT END) IS LIT AT LOW BRIGHTNESS |
| RECOVERING INDICATION | LIGHTING OF WHITE LEDs SHIFT FROM LEFT END TOWARD RIGHT END |
| PREPARING-FOR-JOB-EXECUTION INDICATION | ONE WHITE LED (LEFT END) BLINKS |
| EXECUTING JOB INDICATION | LIGHTING OF WHITE LEDs RECIPROCATES BETWEEN LEFT END AND RIGHT END |

| STATE OF LIQUID | LIGHT EMISSION PATTERN |
| --- | --- |
| TANK OF M REQUIRES REPLACING | ... |
| TANK OF BK REQUIRES REPLACING | ... |
| ⋮ | ⋮ |

INFORMATION PROCESSING APPARATUS AND NOTIFICATION METHOD

CROSS-REFERENCE TO RELATED APPLICATIONS

The present application is a continuation of U.S. patent application Ser. No. 17/722,175, filed on Apr. 15, 2022, which is a continuation of U.S. patent application Ser. No. 16/909,750, filed on Jun. 23, 2020 and issued as U.S. Pat. No. 11,331,928 on May 17, 2022, which claims priority from Japanese Patent Application No. 2019-120952 filed Jun. 28, 2019, which are hereby incorporated by reference herein in their entireties.

BACKGROUND

Field

The present disclosure relates to an information processing apparatus and a notification method.

Description of the Related Art

In an image forming apparatus without a liquid crystal panel or any other display for displaying information, the state of the apparatus is notified to the outside by lighting an indicator light mounted to the apparatus. In Japanese Patent Application Laid-Open No. 2004-188638, there is described a printer apparatus including indicator lamps, which are mounted on a main body of the apparatus, a carriage capable of coming to a stop at any place, and a maintenance cover transmissive of light of the indicator lamps.

In the printer apparatus described in Japanese Patent Application Laid-Open No. 2004-188638, it is not easy to check that the indicator lamps are lit through the maintenance cover when the maintenance cover is closed. For instance, when an ink tank is required to be replaced while the printer apparatus is printing, steps of operating the printer apparatus including the opening of the maintenance cover are required in order to correctly recognize which ink tank requires to be replaced. Therefore, it may be difficult to determine which ink tank requires replacing when something hinders a user from operating the apparatus.

SUMMARY

An aspect of the present disclosure is to provide an information processing apparatus and a notification method with which to alleviate the difficulty of correctly recognizing a tank to be notified when something hinders a user from operating an apparatus.

According to at least one embodiment of the present disclosure, there is provided an information processing apparatus having a plurality of liquid tanks, for storing liquids to be ejected onto a recording medium, which are to be loaded, the information processing apparatus including: a state detection unit configured to detect states of the liquids contained in the plurality of liquid tanks; a light emission unit attached to an external surface of the information processing apparatus with a cover closed, the cover being opened when the plurality of tanks are operated on; and a control unit configured to control the light emission unit, based on the state of the liquid detected by the state detection unit being a predetermined state in one of the plurality of liquid tanks, so that the light emission unit emits light in a light emission pattern corresponding to the one of the plurality of liquid tanks that contains the liquid in the predetermined state, out of a plurality of light emission patterns corresponding to the plurality of liquid tanks, wherein the control unit is configured to control the light emission unit so that the light emission pattern is changed to a different light emission pattern, based on an opening of the cover being detected by the state detection unit during light emission of the light emission unit in the light emission pattern.

Further features will become apparent from the following description of exemplary embodiments with reference to the attached drawings.

BRIEF DESCRIPTION OF THE DRAWINGS

FIG. 8 is a diagram for illustrating brightnesses at which the white indicator lamps are lit and which are based on the remaining ink amounts.

FIG. 9 is a table for showing association between an indicated status and a light emission pattern.

DESCRIPTION OF THE EMBODIMENTS

At least one embodiment of the present disclosure is described below with reference to the drawings.

Figure 1:
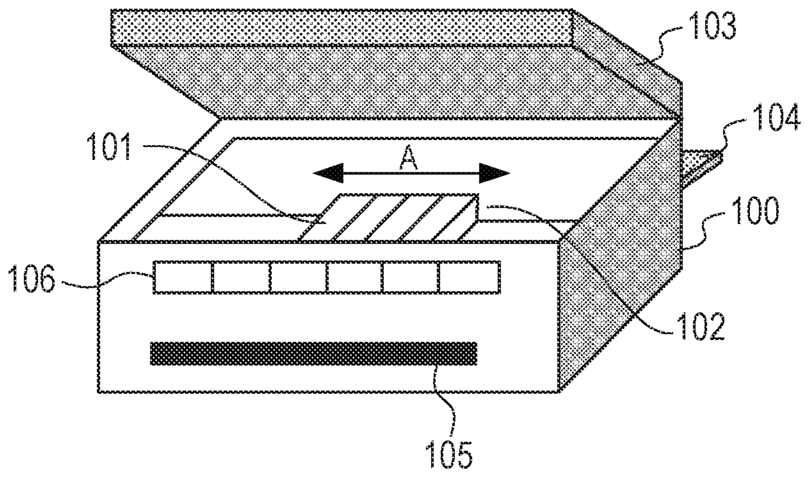
FIG. 1 is a diagram for illustrating a mode of exterior appearance of an information processing apparatus according to at least one embodiment of the present disclosure.

FIG. 1 is a diagram for illustrating a mode of exterior appearance of an image forming apparatus, which is an example of an information processing apparatus according to at least one embodiment. An image forming apparatus 100 illustrated in FIG. 1 includes ink tanks 101, a carriage 102, a maintenance cover 103, a sheet feeding unit 104, a sheet delivery tray 105, and a status bar 106. The image forming apparatus 100 is a single-function printer (SFP), which does not have a reading function (a scanner). The ink tanks 101 are liquid tanks each for storing a liquid to be ejected onto a recording medium. The plurality of detachable ink tanks 101 are attached to the carriage 102, and the carriage 102 uses a drive force generated by a carriage driving motor (not shown) to reciprocate in the direction of the arrow A of FIG. 1. The maintenance cover 103 is an openable cover that enables a user to access the interior of a main body for the purpose of, for example, replacing an ink tank, removing a jammed sheet, and cleaning. The sheet feeding unit 104 is an inlet for placing recording sheets of various sizes. The sheet delivery tray 105 is a tray onto which a recording sheet that has been placed in the sheet feeding unit 104, conveyed, and finished being printed is to be delivered. The status bar 106 is a light emission unit, which includes a plurality of indicator lamps (light emission members) and is attached to an external surface of the image forming apparatus 100 with the maintenance cover 103 closed. That is, the status bar 106 is attached in a place viewable from the outside of the image forming apparatus 100 irrespective of whether the maintenance cover 103 is open or closed. The status bar 106 notifies the state of the image forming apparatus 100 to the outside through its light emission pattern. The status bar 106 is attached in a place that allows a user to recognize its light emission pattern even when it is difficult for the user to operate the image forming apparatus 100 due to the location of the user.

Figure 2:
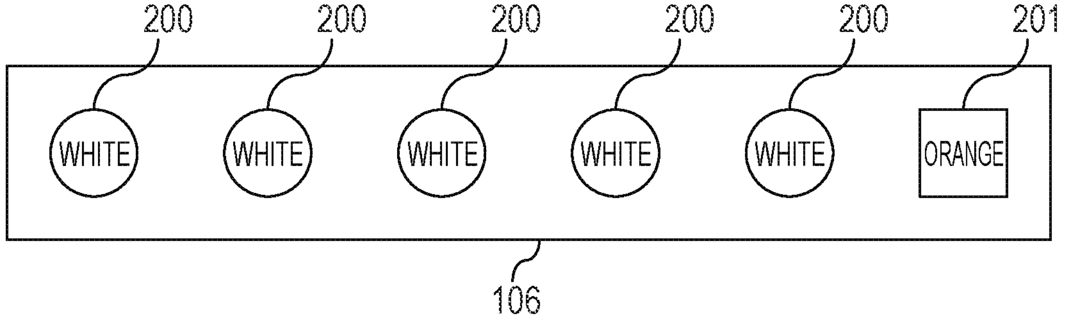
FIG. 2 is a diagram for illustrating an example of a configuration of a status bar.

FIG. 2 is a diagram for illustrating an example of a configuration of the status bar 106 illustrated in FIG. 1. As illustrated in FIG. 2, five white indicator lamps 200 and one orange indicator lamp 201, which are aligned into a straight line, are attached to the status bar 106 illustrated in FIG. 1. The orange indicator lamp 201 is placed at a right end of the status bar 106. The color in which the orange indicator lamp 201 (a first light emission member) is lit may thus differ from the color in which the rest of light emission members (light emission members other than the first light emission member), namely, the white indicator lamps 200, are lit. The status bar 106 may be designed so that the orange indicator lamp 201 is lit when the state of the image forming apparatus 100 notified through a light emission pattern has an importance level set in advance. The brightnesses of the white indicator lamps 200 and the orange indicator lamp 201 are changeable. Light emitting elements (for example, LEDs) are used for the white indicator lamps 200 and the orange indicator lamp 201. The colors in which the indicator lamps emit light are not limited to white and orange. The arrangement of the indicator lamps on the status bar 106 is not limited to the one illustrated in FIG. 2.

Figure 3:
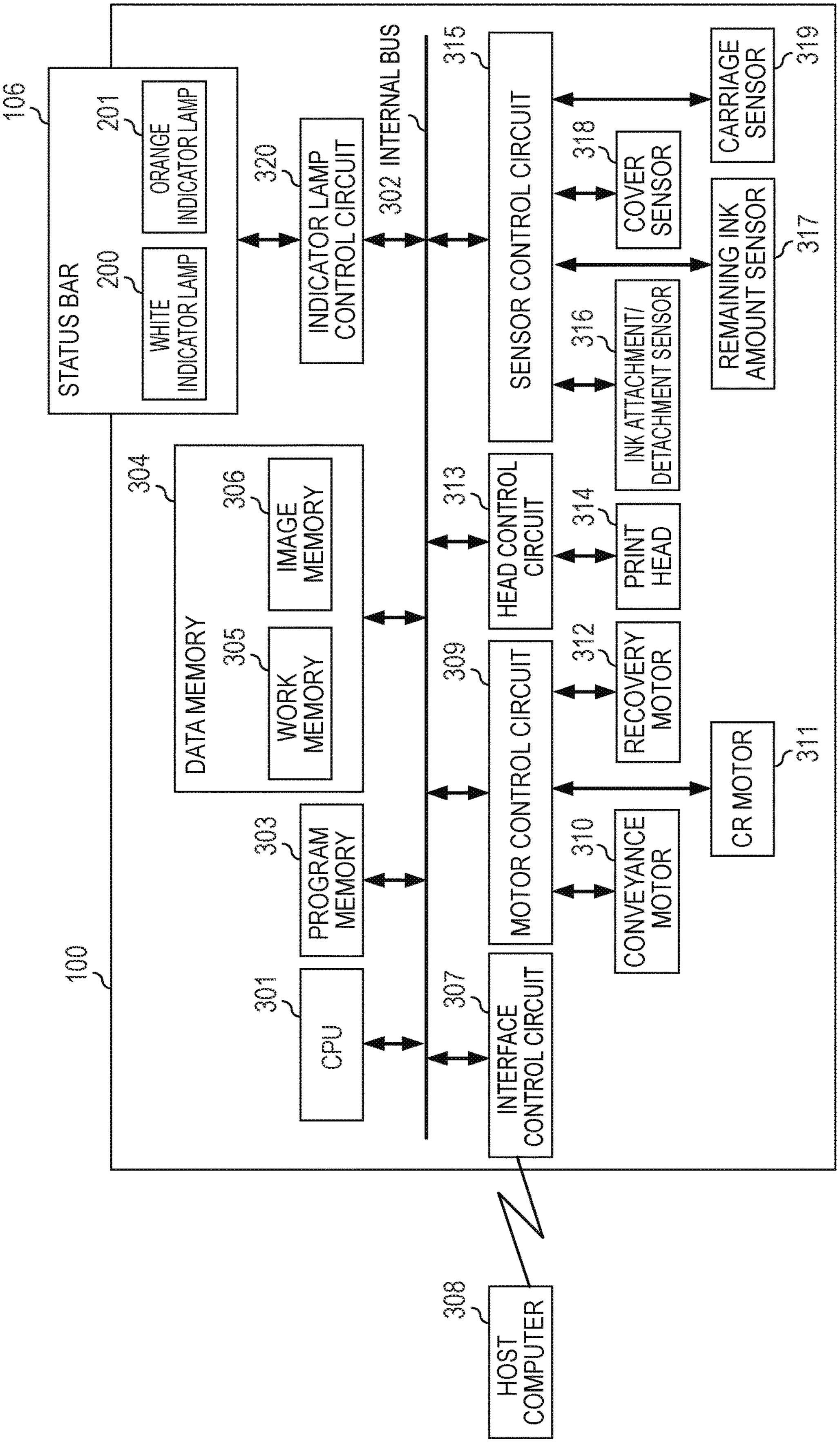
FIG. 3 is a diagram for illustrating an internal configuration of an image forming apparatus illustrated in FIG. 1.

FIG. 3 is a diagram for illustrating an example of an internal configuration of the image forming apparatus 100 illustrated in FIG. 1. As illustrated in FIG. 3, the image forming apparatus 100 illustrated in FIG. 1 includes a central processing unit (CPU) 301, a program memory 303, a data memory 304, the status bar 106, an indicator lamp control circuit 320, an interface control circuit 307, a motor control circuit 309, a conveyance motor 310, a CR motor 311, a recovery motor 312, a head control circuit 313, a print head 314, a sensor control circuit 315, an ink attachment/detachment sensor 316, a remaining ink amount sensor 317, a cover sensor 318, and a carriage sensor 319.

The CPU 301 controls the components via an internal bus 302. The operation of the CPU 301 in the form of a microprocessor is based on data stored in the program memory 303, which is in the form of a read-only memory (ROM), and data stored in the data memory 304, which is in the form of a random access memory (RAM). The data memory 304 includes a work memory 305 to be used when the CPU 301 executes a control program, and an image memory 306 for storing image data to be formed on a recording medium. The CPU 301 controls the interface control circuit 307 to receive printing job data from a host computer 308, which is connected to the image forming apparatus 100 via an external interface, and to notify the status of the image forming apparatus 100 to the host computer 308. The motor control circuit 309 controls the driving of the conveyance motor 310, the CR motor 311, and the recovery motor 312 based on a control signal from the CPU 301. The conveyance motor 310 drives sheet feeding rollers, conveyance rollers, and sheet delivery rollers to convey a recording sheet, which is a recording medium, from the sheet feeding unit 104 to the sheet delivery tray 105. The CR motor 311 is a carriage motor by which the carriage is reciprocally driven. The recovery motor 312 drives a recording head recovery mechanism and controls the mechanism in synchronization with the driving of the carriage, to thereby execute recovery operation for keeping the print head 314 in an appropriate state. The head control circuit 313 controls the print head 314 in synchronization with the reciprocal operation of the carriage, based on a control signal from the CPU 301. The print head 314 forms an image on a recording sheet, which is a recording medium. The ink attachment/detachment sensor 316 detects that one of the ink tanks 101 has been detached from the carriage 102, and detects that the ink tank 101 that is compatible with the image forming apparatus 100 has been attached to the carriage 102. The remaining ink amount sensor 317 detects, for each of the ink tanks 101, a remaining ink amount, which is the amount of ink remaining in the ink tank. The cover sensor 318 detects that the maintenance cover 103 has been opened or closed. The carriage sensor 319 detects that the carriage 102 has moved. The ink attachment/detachment sensor 316, the remaining ink amount sensor 317, the cover sensor 318, and the carriage sensor 319 each include a mechanical switch. The sensor control circuit 315 notifies detection results from those sensors to the CPU 301. The indicator lamp control circuit 320 controls, based on a control signal from the CPU 301, the lengths of time for which the white indicator lamps 200 and orange indicator lamp 201 attached to the status bar 106 are lit, the lengths of time for which the white indicator lamps 200 and the orange indicator lamp 201 are off, and the time interval of blinking, to thereby create a light emission pattern corresponding to the state of the image forming apparatus 100.

Figure 4:
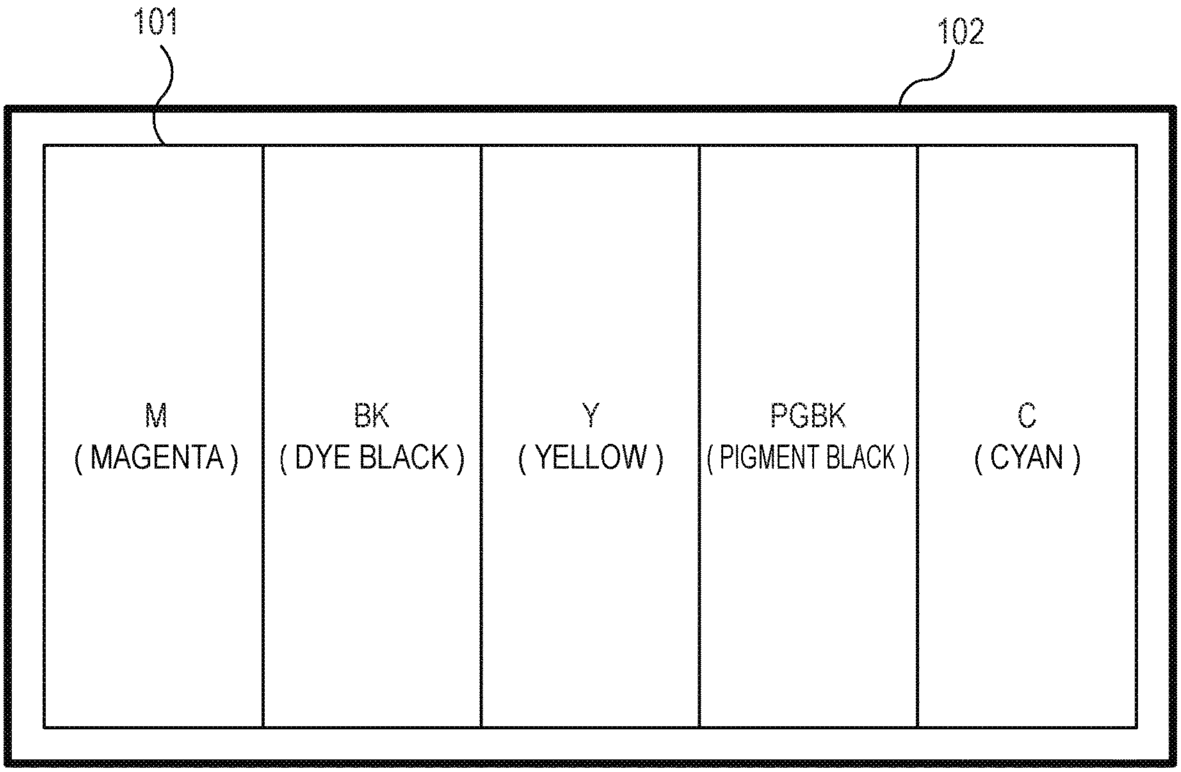
FIG. 4 is a diagram for illustrating an example of a mode of mounting ink tanks.

FIG. 4 is a diagram for illustrating an example of a mode of mounting the ink tanks 101 to the carriage 102 illustrated in FIG. 1. In the example illustrated in FIG. 4, the ink tanks 101 of five colors can be attached to the carriage 102. In this case, as illustrated in FIG. 4, the ink tanks 101 are attached in the order of magenta (M), dye black (BK), yellow (Y), pigment black (PGBK), and cyan (C) from the left-hand side of the carriage 102.

Examples of items to be detected/determined by the image forming apparatus 100 as its own running state include a normal state, an error state, a job executing state, and an idle state. When it is determined that the image forming apparatus 100 is in a normal state, for example, the indicator lamp control circuit 320 turns off all of the white indicator lamps 200 and the orange indicator lamp 201.

Indicator lamp control executed when the image forming apparatus 100 is in an error state and the error is a low-ink error (an ink-tank-replacing-required error) is described below. The notification of the low-ink error is an alert for notifying the outside when the remaining ink amount is small in at least one of the ink tanks 101 attached to the carriage 102, that the ink tank 101 having a small amount of remaining ink requires replacing. The following description takes as an example a case in which, out of the ink tanks 101 of five colors illustrated in FIG. 4, the third tank from the left containing yellow (Y) ink is small in remaining ink amount and requires replacing.

Figure 5:
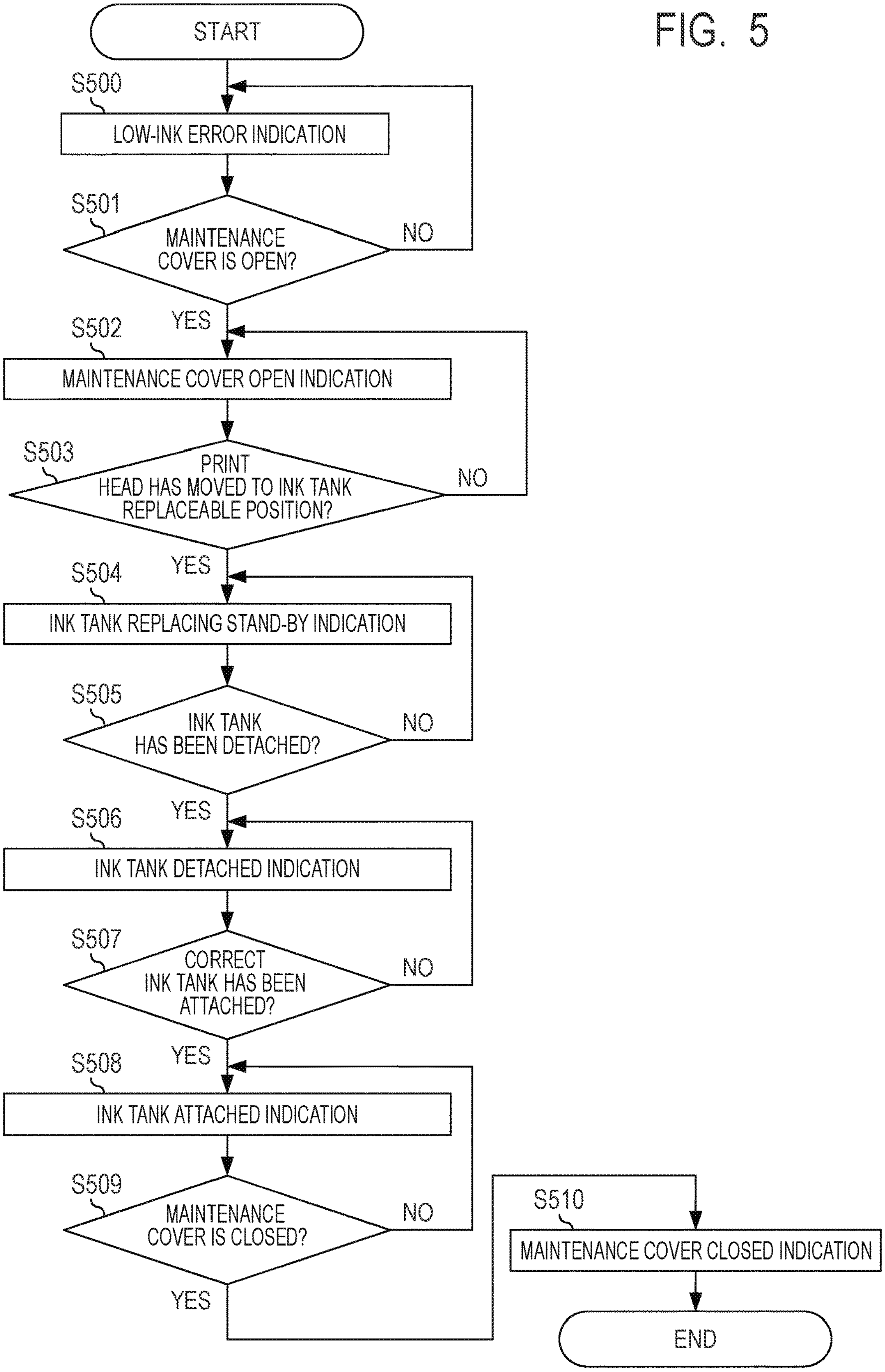
FIG. 5 is a flow chart for illustrating processing that is executed when a low-ink error occurs.

FIG. 5 is a flow chart for illustrating an example of processing that is executed in the image processing apparatus 100 when a low-ink error occurs.

First, when the remaining ink amount sensor 317 detects that the remaining ink amount has become smaller than a predetermined amount (threshold value) in any one of the ink tanks 101, the sensor control circuit 315 notifies the fact to the CPU 301. Then, the CPU 301 specifies a light emission pattern corresponding to the notified situation to the indicator lamp control circuit 320. The indicator lamp control circuit 320 lights the white indicator lamp 200 that corresponds to the ink tank having a remaining ink amount smaller than the predetermined amount and the orange indicator lamp 201 in the light emission pattern specified by the CPU 301 (Step S500). This light emission pattern is a pattern unique to the indication of the low-ink error. Even when it is difficult for the user to operate the image forming apparatus 100, the user can therefore recognize the fact that the low-ink error has occurred and the ink tank with a small remaining ink amount out of the plurality of ink tanks.

The cover sensor 318 subsequently determines whether the maintenance cover 103 is open (Step S501). When determining that the maintenance cover 103 is closed, the cover sensor 318 does not particularly issue a notification, and the indicator lamp control circuit 320 therefore continues the current light emission pattern of the white indicator lamps 200 and the orange indicator lamp 201. When the cover sensor 318 determines that the maintenance cover 103 is open, on the other hand, the sensor control circuit 315 sends a notification to that effect to the CPU 301. The CPU 301 specifies a light emission pattern corresponding to the notified maintenance cover open state to the indicator lamp control circuit 320. The indicator lamp control circuit 320 lights the white indicator lamps 200 and the orange indicator lamp 201 in the light emission pattern specified by the CPU 301 (Step S502).

The carriage sensor 319 subsequently determines whether the carriage 102 has moved to a position at which the ink tank can be replaced (Step S503). When determining that the carriage 102 has not moved to the position at which the ink tank can be replaced, the carriage sensor 319 does not particularly issue a notification, and the indicator lamp control circuit 320 therefore continues the current light emission pattern of the white indicator lamps 200 and the orange indicator lamp 201. When the carriage sensor 319 determines that the carriage 102 has moved to the position at which the ink tank can be replaced, on the other hand, the sensor control circuit 315 sends a notification to that effect to the CPU 301. The CPU 301 specifies a light emission pattern corresponding to the notified ink tank replacing stand-by state to the indicator lamp control circuit 320. The indicator lamp control circuit 320 lights the white indicator lamps 200 and the orange indicator lamp 201 in the light emission pattern specified by the CPU 301 (Step S504).

The ink attachment/detachment sensor 316 subsequently determines whether the relevant ink tank 101 has been detached from the carriage 102 (Step S505). When determining that the ink tank 101 has not been detached from the carriage 102, the ink attachment/detachment sensor 316 does not particularly issue a notification, and the indicator lamp control circuit 320 therefore continues the current light emission pattern of the white indicator lamps 200 and the orange indicator lamp 201. When the ink attachment/detachment sensor 316 determines that the relevant ink tank has been detached from the carriage 102, on the other hand, the sensor control circuit 315 sends a notification to that effect to the CPU 301. The CPU 301 specifies a light emission pattern corresponding to the notified ink tank detached state to the indicator lamp control circuit 320. The indicator lamp control circuit 320 lights the white indicator lamps 200 and the orange indicator lamp 201 in the light emission pattern specified by the CPU 301 (Step S506).

The ink attachment/detachment sensor 316 subsequently determines whether the correct ink tank 101 has been attached to the carriage 102 (Step S507). When determining that the correct ink tank 101 has not been attached to the carriage 102, the ink attachment/detachment sensor 316 does not particularly issue a notification, and the indicator lamp control circuit 320 therefore continues the current light emission pattern of the white indicator lamps 200 and the orange indicator lamp 201. When the ink attachment/detachment sensor 316 determines that the correct ink tank 101 has been attached to the carriage 102, on the other hand, the sensor control circuit 315 sends a notification to that effect to the CPU 301. The CPU 301 specifies to the indicator lamp control circuit 320 a light emission pattern corresponding to the notified state in which the correct ink tank is attached. The indicator lamp control circuit 320 lights the white indicator lamps 200 and the orange indicator lamp 201 in the light emission pattern specified by the CPU 301 (Step S508).

The cover sensor 318 subsequently determines whether the maintenance cover 103 is closed (Step S509). When determining that the maintenance cover 103 is not closed, the cover sensor 318 does not particularly issue a notification, and the indicator lamp control circuit 320 therefore continues the current light emission pattern of the white indicator lamps 200 and the orange indicator lamp 201. When the cover sensor 318 determines that the maintenance cover 103 is closed, on the other hand, the sensor control circuit 315 sends a notification to that effect to the CPU 301. The CPU 301 specifies a light emission pattern corresponding to the notified maintenance cover closed state to the indicator lamp control circuit 320. The indicator lamp control circuit 320 lights the white indicator lamps 200 and the orange indicator lamp 201 in the light emission pattern specified by the CPU 301 (Step S510).

The light emission patterns of the white indicator lamps 200 and the orange indicator lamp 201 in the processing steps described with reference to FIG. 5 are described below. FIG. 6A to FIG. 6D are diagrams for illustrating an example of the light emission patterns of the white indicator lamps 200 and the orange indicator lamp 201 in the processing steps described with reference to FIG. 5. The example given in FIG. 6A to FIG. 6D has five white indicator lamps 200. In FIG. 6A to FIG. 6D, a lit lamp among the white indicator lamps 200 and the orange indicator lamp 201 is represented by a white graphic with black outline and an unlit lamp among the white indicator lamps 200 and the orange indicator lamp 201 is represented by a black graphic, (the same applies to the rest of the drawings).

Figure 6A:
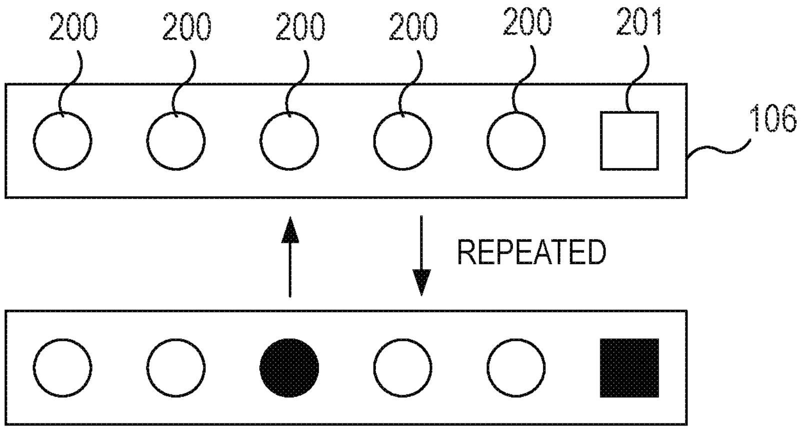
FIG. 6A, FIG. 6B, FIG. 6C, and FIG. 6D are diagrams for illustrating light emission patterns of white indicator lamps and an orange indicator lamp.

An example of the light emission pattern indicating the low-ink error in Step S500 and the light emission pattern indicating the wait for ink tank replacing in Step S504 is illustrated in FIG. 6A. Each of the five white indicator lamps 200 corresponds to one of the ink tanks 101 in five colors on a one-to-one basis. Here, out of the ink tanks 101 attached to the carriage 102 in an arrangement that is illustrated in FIG. 4, the magenta (M) ink tank 101, which is the first from the left, is associated with the first white indicator lamp 200 from the left out of the white indicator lamps 200 attached to the status bar 106. Out of the ink tanks 101 attached to the carriage 102 in the arrangement that is illustrated in FIG. 4, the dye black (BK) ink tank 101, which is the second from the left, is associated with the second white indicator lamp 200 from the left out of the white indicator lamps 200 attached to the status bar 106. Out of the ink tanks 101 attached to the carriage 102 in the arrangement that is illustrated in FIG. 4, the yellow (Y) ink tank 101, which is the third from the left, is associated with the third white indicator lamp 200 from the left out of the white indicator lamps 200 attached to the status bar 106. Out of the ink tanks 101 attached to the carriage 102 in the arrangement that is illustrated in FIG. 4, the pigment black (PGBK) ink tank 101, which is the fourth from the left, is associated with the fourth white indicator lamp 200 from the left out of the white indicator lamps 200 attached to the status bar 106. Out of the ink tanks 101 attached to the carriage 102 in the arrangement that is illustrated in FIG. 4, the cyan (C) ink tank 101, which is the fifth from the left, is associated with the fifth white indicator lamp 200 from the left out of the white indicator lamps 200 attached to the status bar 106. When the ink tanks and the lamps are associated in this way and the remaining amount of the yellow (Y) ink, which is the third from the left out of the ink tanks 101 attached to the carriage 102 in the arrangement that is illustrated in FIG. 4, becomes smaller than a threshold value that is a replacing requiring value set in advance, the third white indicator lamp 200 from the left, as well as the orange indicator lamp 201 for indicating that an error has occurred, has a light emission pattern in which the lamp blinks, and the other white indicator lamps 200 have a light emission pattern in which the lamps are kept lit. The indicator lamp control circuit 320 thus performs control so that the light emission pattern of the white indicator lamp 200 associated with the ink tank 101 that has a remaining ink amount smaller than the predetermined threshold value and the orange indicator lamp 201 differs from the light emission pattern of the white indicator lamps 200 other than the associated white indicator lamp 200. With the light emission pattern illustrated in FIG. 6A, the type of the ink tank to be replaced and the position of the ink tank on the carriage 102 can be notified to the outside of the image forming apparatus 100.

Figure 6B:
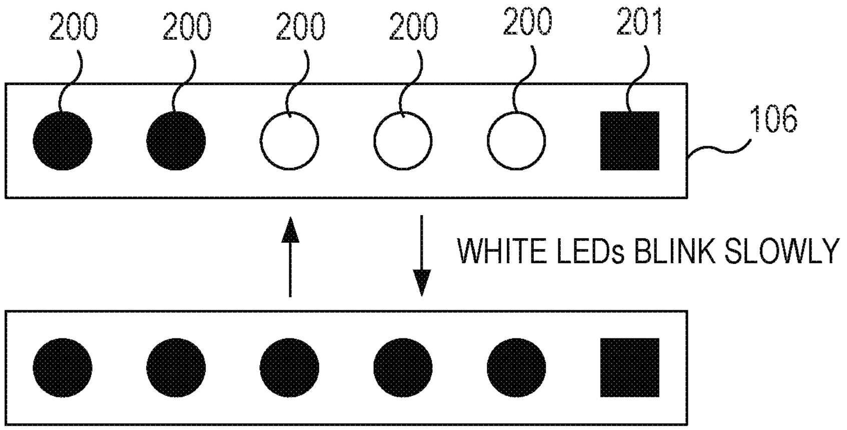

An example of the light emission pattern indicating the maintenance cover open state in Step S502 and the light emission pattern indicating the maintenance cover closed state in Step S510 is illustrated in FIG. 6B. In this case, three white indicator lamps 200 that are the third to fifth white indicator lamps 200 from the left slowly blink, and the rest of the white indicator lamps 200 and the orange indicator lamp 201 are off.

Figure 6C:
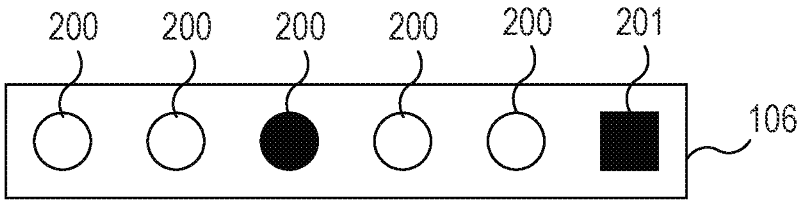

An example of the light emission pattern for the detachment of the relevant ink tank 101 from the carriage 102 in Step S506 is illustrated in FIG. 6C. The white indicator lamp 200 corresponding to the position of the ink tank 101 that has been detached from the carriage 102 and the orange indicator lamp 201, which is an error indicating lamp, are turned off and the rest of the white indicator lamps 200 are lit, to thereby notify which ink tank has been detached to the outside of the image forming apparatus 100. In the light emission pattern illustrated in FIG. 6C, the third white indicator lamp 200 from the left and the orange indicator lamp 201 are turned off when the yellow (Y) ink tank, which is the third from the left, out of the ink tanks 101 of five colors attached to the carriage 102 in the arrangement that is illustrated in FIG. 4.

Figure 6D:
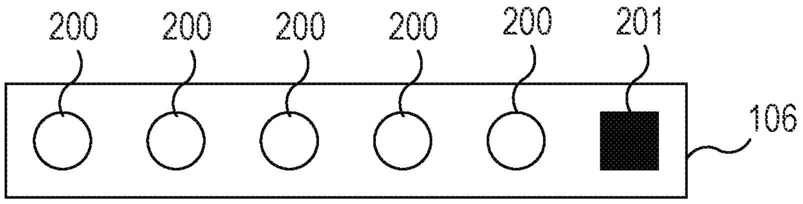

An example of the light emission pattern for the attachment of the correct ink tank 101 to the carriage 102 in Step S508 is illustrated in FIG. 6D. In this case, the orange indicator lamp 201 is off and the white indicator lamps 200 are all lit. This notifies the outside that the correct ink tank 101 has been attached to the carriage 102, and that the error has been solved as a result.

An example of a light emission pattern for when the image forming apparatus 100 executes a printing job based on job data that is received from the host computer 308 illustrated in FIG. 3 is described below through an example.

Figure 7:
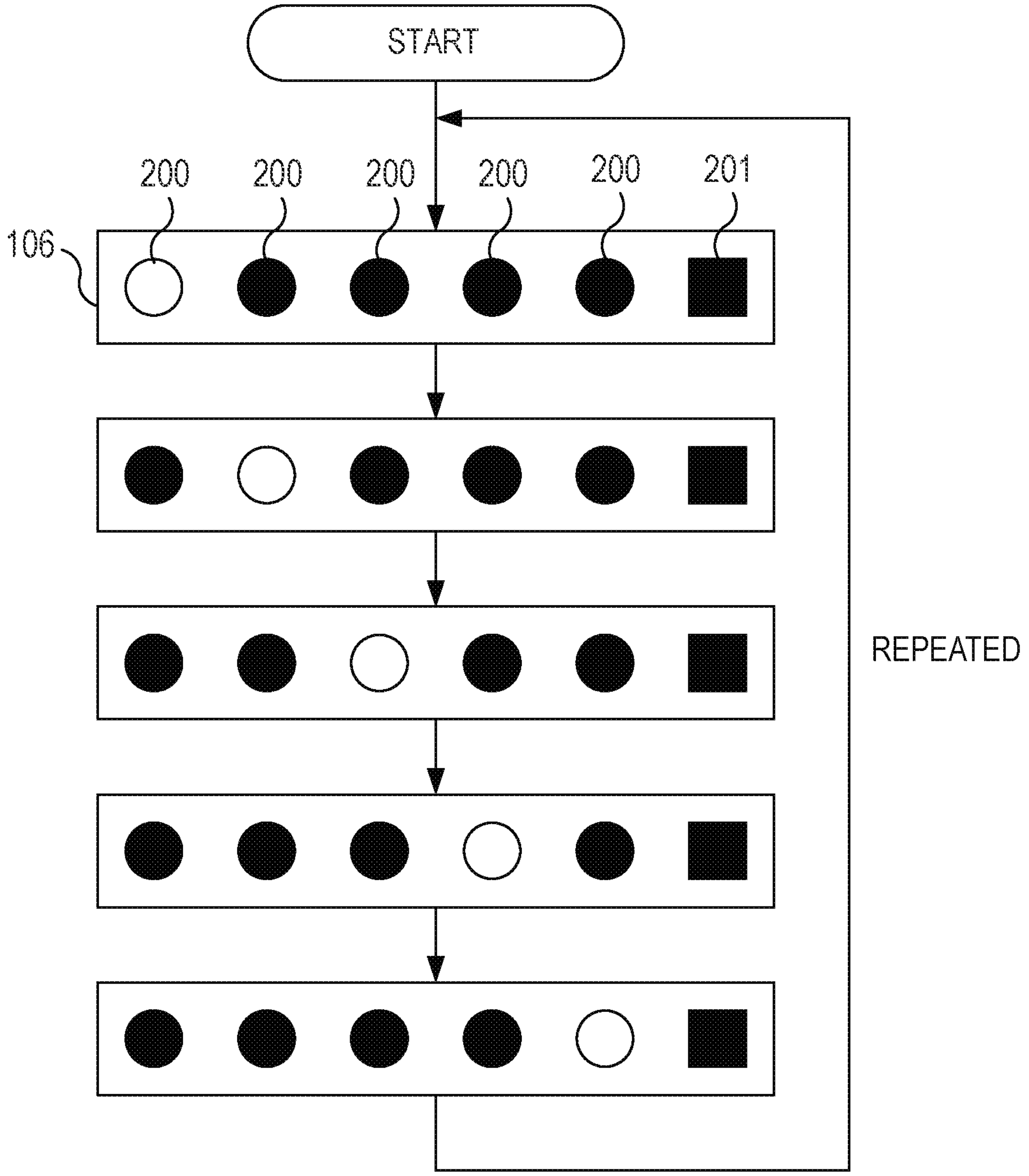
FIG. 7 is a diagram for illustrating a light emission pattern that indicates that a printing job is being executed.

FIG. 7 is a diagram for illustrating an example of a light emission pattern that indicates that the image forming apparatus 100 is executing a printing job. When the image forming apparatus 100 receives job data for printing from the host computer 308, the CPU 301 controls the status bar 106 via the indicator lamp control circuit 320. Specifically, the CPU 301 instructs the indicator lamp control circuit 320 to set the light emission pattern of the white indicator lamps 200 and the orange indicator lamp 201 to a light emission pattern corresponding to the state of the image forming apparatus 100 that is in the middle of a printing job. The indicator lamp control circuit 320 instructed by the CPU 301 controls the white indicator lamps 200 and the orange indicator lamp 201 so that the lamps are lit in the corresponding light emission pattern. The controlled lamps are lit and turned off as illustrated in FIG. 7, in which the first white indicator lamp 200 from the left is lit first while the rest of the white indicator lamps 200 and the orange indicator lamp 201 are turned off, and the white indicator lamp 200 that is lit is switched from one lamp to its immediate right lamp in a predetermined cycle. The image forming apparatus 100 repeats the switching of the lit lamp until the printing job is finished. The switching of the white indicator lamp 200 that is lit makes it seem like the light moves from the left end rightward. When the CPU 301 determines that the printing job is finished, the white indicator lamps 200 and the orange indicator lamp 201 on the status bar 106 are all turned off to return to a normal state.

The CPU 301 may further control, via the indicator lamp control circuit 320, brightnesses at which the white indicator lamps 200 are lit. For example, the CPU 301 may perform control, via the indicator lamp control circuit 320, so that the white indicator lamps 200 are lit at brightnesses based on the remaining ink amounts in the ink tanks 101.

FIG. 8 is a diagram for illustrating an example of the brightnesses of the lit white indicator lamps 200 that are controlled in accordance with the remaining ink amounts. As in FIG. 6A, the five white indicator lamps 200 correspond to the ink tanks 101 of five colors on a one-to-one basis. The association of the five white indicator lamps 200 with the ink tanks 101 of five colors is the same as the association illustrated in FIG. 6A. As illustrated in FIG. 8, the brightnesses of the white indicator lamps 200 are controlled in accordance with the remaining ink amounts in the ink tanks 101 (in liquid tanks) that are detected by the remaining ink amount sensor 317. Brightness values indicated in FIG. 8 are designed so that a large value indicates a high brightness. In short, when the remaining ink amount is larger in one of the ink tanks 101, control is performed so that the white indicator lamp 200 associated with the ink tank 101 is lit at a higher brightness.

The brightness of each lit white indicator lamp 200 is thus changed in accordance with the remaining ink amount in the ink tank 101 that is associated with the lit white indicator lamp 200. This enables a user to check the remaining amount in each ink tank even when something hinders the user from operating the image forming apparatus 100.

The light emission pattern determination described above, which is executed by the CPU 301, may use a table in which an indicated status and a light emission pattern are associated with each other in advance. The CPU 301 refers to the table to read a light emission pattern out of the table, with an indicated status as a search key.

FIG. 9 is a table for showing an example of the association between an indicated status and a light emission pattern. As shown in FIG. 9, an indicated status "power-is-on indication", for example, is associated with a light emission pattern "lighting of white LEDs shifts from center toward left and right ends". This means that a light emission pattern used when the image forming apparatus 100 is in a state in which power is switched on and booting is being executed, is a pattern in which the white indicator lamps 200 that are lit are sequentially switched from the white indicator lamps 200 placed at the center to the white indicator lamps 200 placed to the left and right of the lamps at the center. An indicated status "power-is-off indication" is associated with a light emission pattern "lighting of white LEDs shifts from left and right ends toward center". This means that a light emission pattern used when the image forming apparatus 100 is in a state in which power is switched off and a shutdown procedure is in progress is a pattern in which the white indicator lamps 200 that are lit are sequentially switched from the white indicator lamps 200 placed at the left and right ends to the white indicator lamps 200 placed at the center.

In this manner, each indicated status is associated with a light emission pattern on a one-to-one basis in advance, and the indicator lamps are lit in a light emission pattern corresponding to the indicated status. The state of the image forming apparatus can therefore be notified to the outside by the turning on/off of the indicator lamps alone.

Figure 10A:
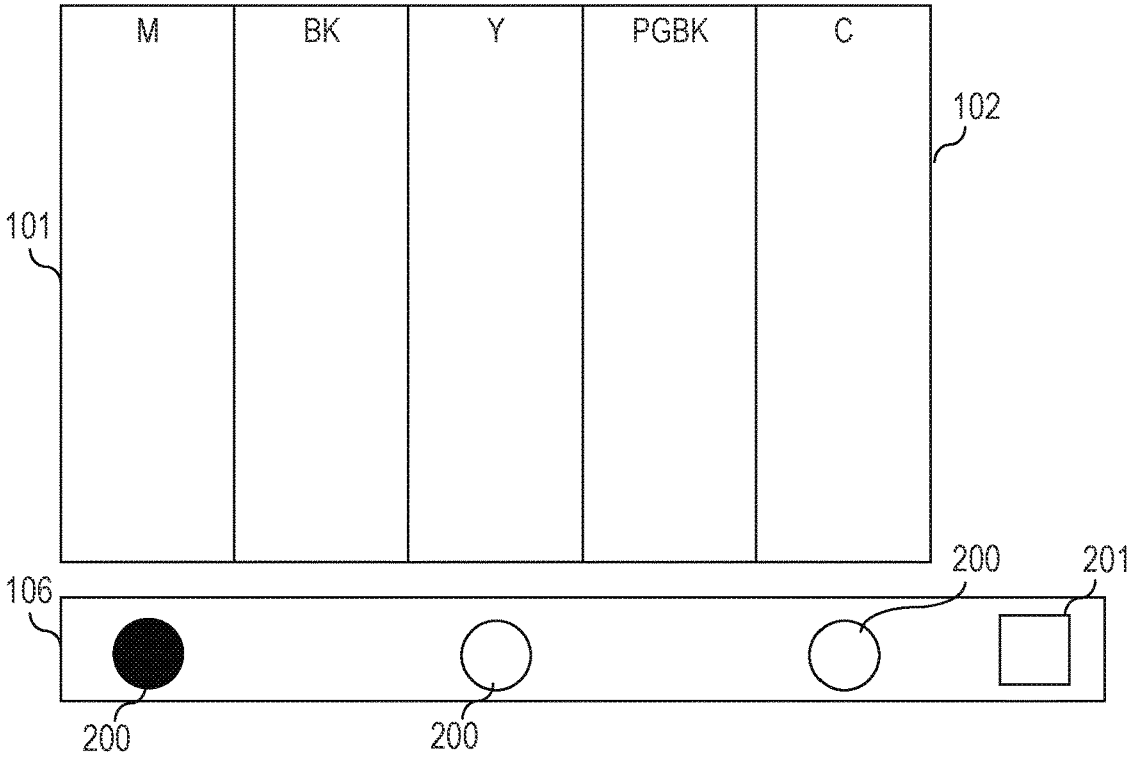
FIG. 10A and FIG. 10B are diagrams for illustrating light emission patterns that are used when the number of white indicator lamps differs from the number of ink tanks.
Figure 10B:
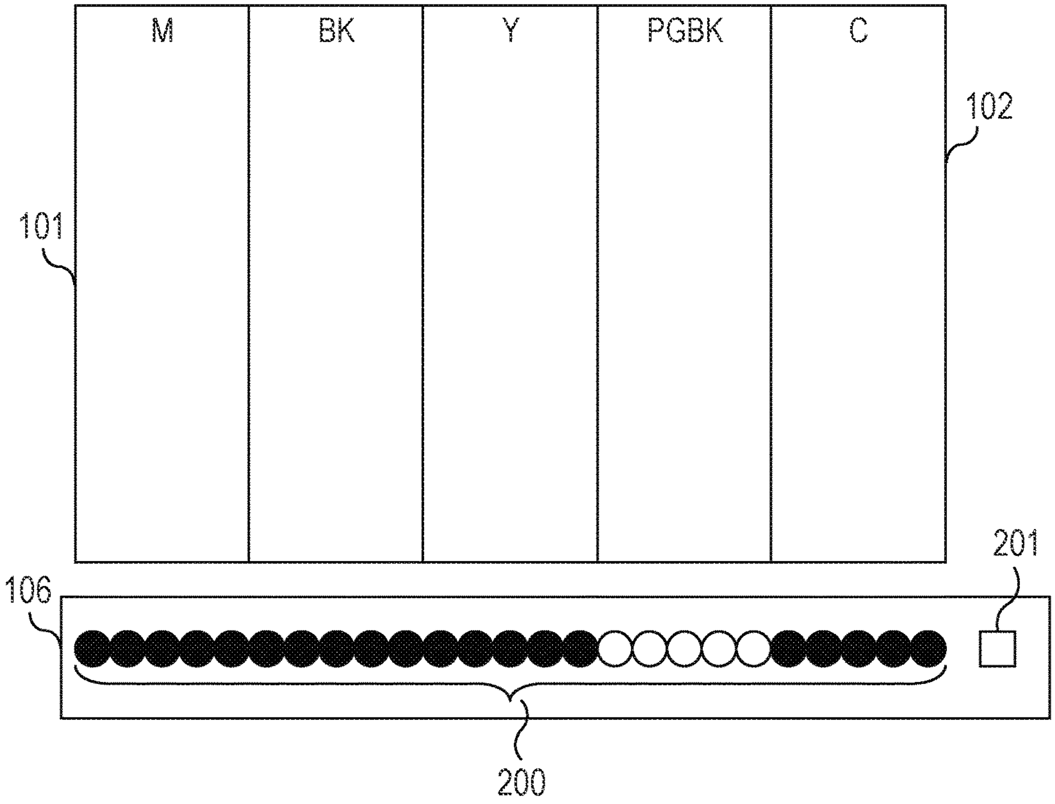

A light emission pattern used when the number of ink tanks 101 and the number of white indicator lamps 200 differ from each other is described below through two examples. FIG. 10A and FIG. 10B are diagrams for illustrating light emission patterns that may be used when the number of white indicator lamps 200 differs from the number of ink tanks 101. An example of a light emission pattern for a case in which the number of white indicator lamps 200 is smaller than the number of ink tanks 101 is illustrated in FIG. 10A. As illustrated in FIG. 10A, the ink tanks 101 of five colors are attached to the carriage 102, and three white indicator lamps 200 and one orange indicator lamp 201 are attached to the status bar 106, for example. When the remaining amount of the pigment black (PGBK) ink in the fourth ink tank from the left out of the ink tanks 101 of five colors becomes smaller than the threshold value and requires replacing, the white indicator lamps 200 and orange indicator lamp 201 attached to the status bar 106 are lit/turned off in a light emission pattern corresponding to the ink tank of pigment black (PGBK), to thereby notify which ink tank is to be replaced to the outside of the apparatus. In the example illustrated in FIG. 10A, the second and third white indicator lamps 200 from the left and the orange indicator lamp 201 are lit, and the rest of the white indicator lamps 200 are turned off. This notifies the outside of the apparatus that the pigment black (PGBK) ink tank is the ink tank 101 to be replaced. In this manner, a corresponding light emission pattern is determined in advance for each ink tank 101 so that the ink tank 101 that has a remaining ink amount smaller than the threshold value can be recognized, and the turning on/off of the white indicator lamps 200 and the orange indicator lamp 201 is controlled to have a relevant light emission pattern.

An example of a light emission pattern for a case in which the number of white indicator lamps 200 is larger than the number of ink tanks 101 is illustrated in FIG. 10B. As illustrated in FIG. 10B, the ink tanks 101 of five colors are attached to the carriage 102, and the number of white indicator lamps 200 that are more than the number of ink tanks 101 and one orange indicator lamp 201 are attached to the status bar 106. In such cases, the white indicator lamps 200 that are attached at a position corresponding to the position of the relevant ink tank 101 and within a range of the width of the relevant ink tank 101 are lit, as well as the orange indicator lamp 201 for indicating an error state, and the rest of the white indicator lamps 200 are all turned off. When the remaining amount of the pigment black (PGBK) ink in the fourth ink tank from the left out of the ink tanks 101 of five colors becomes smaller than the threshold value and requires replacing, the white indicator lamps 200 that are attached within the range of the width of the pigment black (PGBK) ink tank 101 and the orange indicator lamp 201 are lit out of the white indicator lamps 200 attached to the status bar 106, and the rest of the white indicator lamps 200 are all turned off. This notifies the outside of the apparatus that the pigment black (PGBK) ink tank is the ink tank 101 to be replaced. In this manner, in accordance with the position of each of the ink tanks 101 and the position of each of the white indicator lamps 200, the turning on/off of the white indicator lamps 200 and the orange indicator lamp 201 is controlled to have a relevant light emission pattern so that the ink tank 101 that has a remaining ink amount smaller than the threshold value can be recognized.

Figure 11:
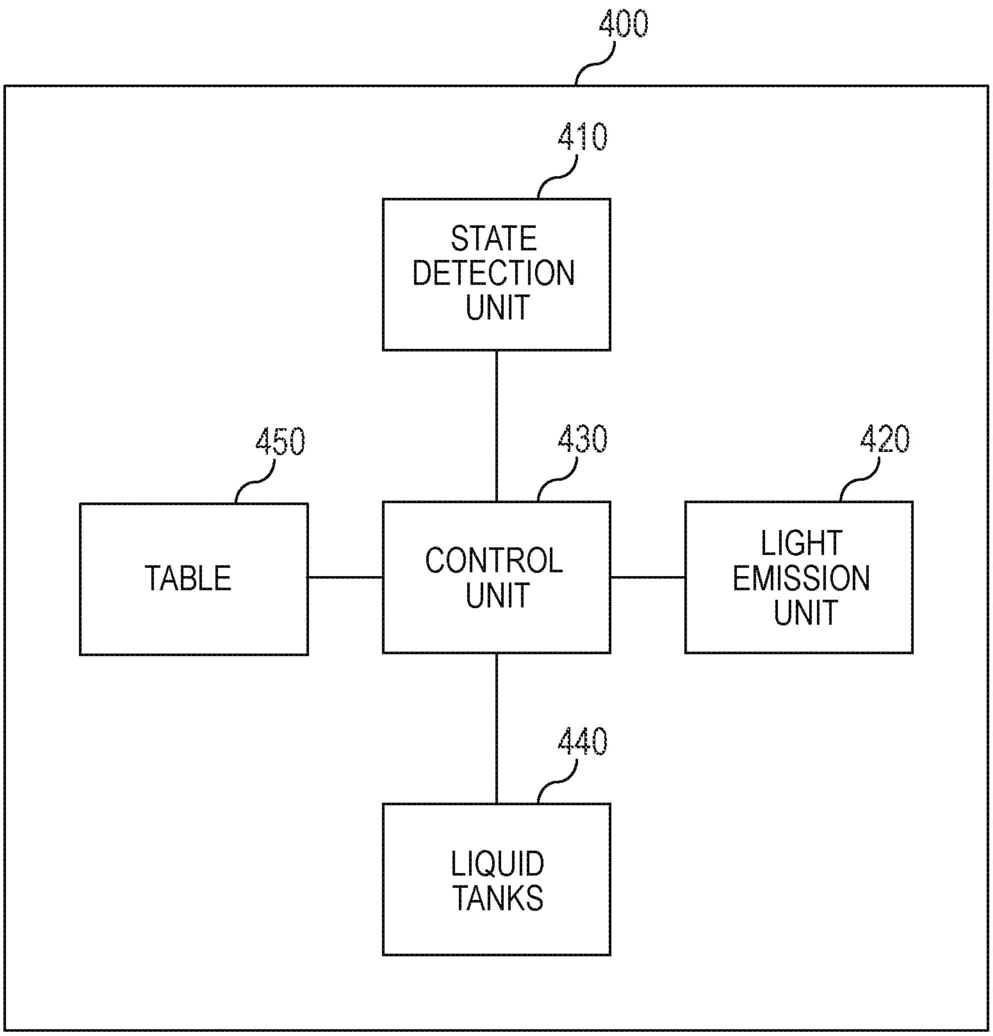
FIG. 11 is a diagram for illustrating the outline of an internal configuration of the information processing apparatus according to at least one embodiment.

FIG. 11 is a diagram for illustrating the outline of an internal configuration of the information processing apparatus according to at least one embodiment. As illustrated in FIG. 11, an information processing apparatus 400 according to at least one embodiment includes a state detection unit 410, a light emission unit 420, a control unit 430, liquid tanks 440, and a table 450. The state detection unit 410 executes detection processing for detecting the state of the information processing apparatus 400. The state detection unit 410 corresponds to the components illustrated in FIG. 3 that detect the state (an operation state, an error state, or the like) of the information processing apparatus 400, for example, the sensor control circuit 315, the ink attachment/detachment sensor 316, the remaining ink amount sensor 317, the cover sensor 318, and the carriage sensor 319. The light emission unit 420 includes a plurality of LEDs or similar light emitting elements, and corresponds to the status bar 106 illustrated in FIG. 3. The liquid tanks 440 are a plurality of ink tanks for storing liquids to be ejected onto a recording medium, and one liquid tank 440 is provided for each color. The liquid tanks 440 correspond to the ink tanks 101 illustrated in FIG. 1. The control unit 430 controls the light emission pattern of the light emission unit 420, based on the ink states in the liquid tanks 440 that are detected by the state detection unit 410. The control unit 430 executes determination processing in which a light emission pattern of the light emission unit 420 is determined based on the ink states in the liquid tanks 440 that are detected by the state detection unit 410, and executes light emission processing in which the light emission unit 420 is controlled so as to emit light in the determined light emission pattern. Specifically, the control unit 430 controls the light emission unit 420 based on the fact that the state of the liquid detected by the state detection unit 410 is a predetermined state (a state in which the remaining liquid amount is smaller than a threshold value) in one of the plurality of liquid tanks 440, so that the light emission unit 420 emits light in a light emission pattern corresponding to the liquid tank 440 that contains the liquid in the predetermined state, out of a plurality of light emission patterns corresponding to the plurality of liquid tanks 440. The control unit 430 corresponds to the CPU 301 and indicator lamp control circuit 320 illustrated in FIG. 3. When the state detection unit 410 is designed to detect the state of the information processing apparatus 400 and there are a plurality of states detected by the state detection unit 410, the control unit 430 may control the light emission pattern of the light emission unit 420 based on a state that is higher in terms of importance level set in advance than the other detected states. The table 450 stores states of liquids contained in the liquid tanks 440 and light emission patterns of the light emission unit 420 in association with each other in advance.

Figures 12, 13:
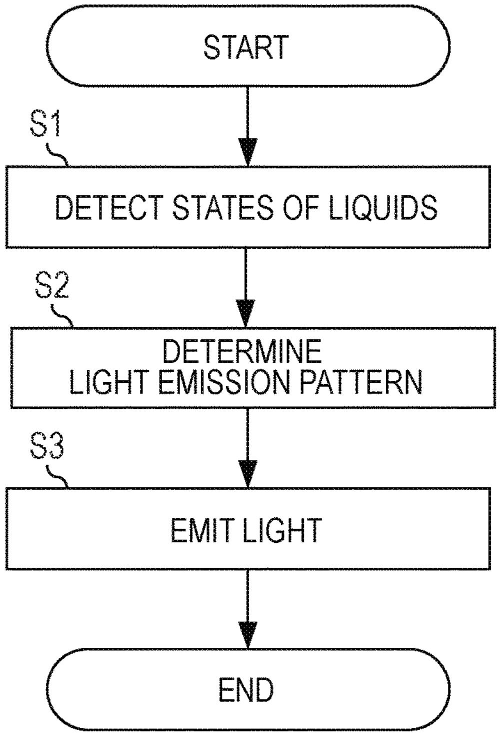
FIG. 12 is a diagram for illustrating association that is stored in a table.
FIG. 13 is a flow chart for illustrating a notification method to be executed in the information processing apparatus.

FIG. 12 is a diagram for illustrating an example of the association that is stored in the table 450 illustrated in FIG. 11. In the table 450 illustrated in FIG. 11, states of liquids contained in the liquid tanks 440 and light emission patterns are associated with each other as illustrated in FIG. 12. The states of liquids are ink states in the liquid tanks 440 that are detected by the state detection unit 410. Specifically, the states of liquids contained indicate which liquid tank out of the liquid tanks 440 requires replacing, how much ink remains in which liquid tank, or the like. The light emission pattern is a pattern of turning on/off light in which the control unit 430 controls the light emission unit 420. The control unit 430 searches the stored association for a light emission pattern by using, as a search key, an ink state that has been detected by the state detection unit 410 in one of the liquid tanks 440.

A notification method to be executed in the information processing apparatus illustrated in FIG. 11 is described below. FIG. 13 is a flow chart for illustrating an example of the notification method to be executed in the information processing apparatus 400 illustrated in FIG. 11. First, the state detection unit 410 detects ink states in the liquid tanks 440 (Step S1). The control unit 430 determines a light emission pattern for the light emission unit 420 based on the ink states in the liquid tanks 440 that have been detected by the state detection unit 410 (Step S2). The determination involves a search of the table 450 for a light emission pattern by the control unit 430, with the ink states in the liquid tanks 440 that have been detected by the state detection unit 410 as a search key. The control unit 430 subsequently controls the light emission unit 420 so that light is emitted in the determined light emission pattern (Step S3).

In at least one embodiment, the light emission unit attached to an external surface of the information processing apparatus is thus controlled so as to emit light in a determined light emission pattern by detecting ink states in the liquid tanks and by determining a light emission pattern based on the detected ink states. A mechanism for checking indicator lamps through the maintenance cover is therefore not required, which leads to cost reduction. In addition, specific information about an error that has occurred can be obtained without opening the maintenance cover. This accordingly enables a user to recognize, in the event of, for example, a low-ink error, which ink tank requires replacing, the position of that ink tank, and other specifics of the error that has occurred, even when something hinders the user from operating the apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A printer apparatus comprising:

a light emission unit;

a display unit for displaying a screen; and a control unit, wherein the control unit is configured to control the display unit and the light emission unit, based on a state of a storage provided in the printer apparatus and storing recording materials used for printing is in a predetermined state, so that a first screen is displayed and so that the light emission unit emits light in a predetermined light emission method, wherein the control unit is configured to control the display unit and the light emission unit, in a state in which the first screen is displayed on the display unit and the light emission unit is controlled to emit light in a predetermined method, when a predetermined operation is performed on the printer apparatus based on the predetermined operation, so that a second screen different from the first screen is displayed and so that a state of the light emission unit is changed, wherein the control unit is configured to control the light emission unit, so that the light emission unit returns to a state in which the light emission unit emits a first light emission pattern, based on a fact that a carriage provided on the storage moves to a predetermined position in a state in which the light emission unit emits a second light emission pattern.

2. The printer apparatus according to claim 1, wherein the light emission unit includes a plurality of aligned light emission members.

3. The printer apparatus according to claim 1, wherein the predetermined state is a state in which remaining amounts of the recording materials in the storage is smaller than a predetermined threshold value.

4. The printer apparatus according to claim 1, wherein the first screen is a screen corresponding to a fact that remaining amounts of the recording materials in the storage is smaller than a predetermined threshold value.

5. The printer apparatus according to claim 1, wherein the predetermined operation is an operation that a cover provided on the printer apparatus is opened.

6. The printer apparatus according to claim 1, wherein the control unit moves the carriage provided on the storage to the predetermined position, based on the predetermined operation performed.

7. The printer apparatus according to claim 6, wherein the control unit is configured to control the display unit, so that a third screen different from the first screen and the second screen is displayed when the carriage moves to the predetermined position.

8. The printer apparatus according to claim 1, wherein the predetermined light emission method is a method that the light emission unit blinks in a predetermined interval.

9. The printer apparatus according to claim 1, wherein the recording materials are ink.

10. The printer apparatus according to claim 1, wherein the predetermined light emission method is a method to emit the first light emission pattern, wherein the control unit is configured to control the light emission unit, so that the light emission unit is in the state in which the light emission unit emits the second light emission pattern different from the first light emission pattern, when the predetermined operation is performed in a state in which the light emission unit emits the first light emission pattern.

11. The printer apparatus according to claim 1, wherein the printer apparatus has a plurality of the storages, wherein the predetermined light emission method is a method to emit a light emission pattern corresponding to the storage which is in the predetermined state among the plurality of storages, among a plurality of light emission patterns.

12. The printer apparatus according to claim 1, wherein the light emission unit includes a plurality of aligned light emission members, wherein each of the plurality of light emission members is associated with one of a plurality of storages, and a plurality of light emission patterns correspond to the plurality of light emission members.

13. The printer apparatus according to claim 1, wherein the control unit is configured to control brightness levels at which the light emission unit is lit, based on remaining amounts of the recording materials contained in the storage.

14. The printer apparatus according to claim 13, wherein the printer apparatus has a plurality of the storages, wherein the light emission unit includes a first light area corresponding to a first storage of the plurality of the storages and a second light area corresponding to a second storage of the plurality of the storages, wherein in the predetermined light emission method, the brightness level of the first light area is controlled, based on the remaining amounts of the recording material contained in the first storage, and the brightness level of the second light area is controlled, based on the remaining amounts of the recording material contained in the second storage.

15. A control method for a printer apparatus, the printer apparatus comprising:

a light emission unit;

a display unit for displaying a screen; and a control unit, the control method comprising:

controlling the display unit and the light emission unit by the control unit, based on a state of a storage provided in the printer apparatus and storing recording materials used for printing is in a predetermined state, so that a first screen is displayed and so that the light emission unit emits light in a predetermined light emission method, controlling the display unit and the light emission unit by the control unit, in a state in which the first screen is displayed on the display unit and the light emission unit is controlled to emit light in a predetermined method, when a predetermined operation is performed on the printer apparatus based on the predetermined operation, so that a second screen different from the first screen is displayed and so that a state of the light emission unit is changed, wherein the control unit is configured to control the light emission unit, so that the light emission unit returns to a state in which the light emission unit emits a first light emission pattern, based on a fact that a carriage provided on the storage moves to a predetermined position in a state in which the light emission unit emits a second light emission pattern.

16. A non-transitory computer-readable storage medium storing a program to cause a computer to perform a control method for controlling a printer apparatus, the printer apparatus comprising:

a light emission unit;

a display unit for displaying a screen; and a control unit, the control method comprising:

controlling the display unit and the light emission unit by the control unit, based on a state of a storage provided in the printer apparatus and storing recording materials used for printing is in a predetermined state, so that a first screen is displayed and so that the light emission unit emits light in a predetermined light emission method, controlling the display unit and the light emission unit by the control unit, in a state in which the first screen is displayed on the display unit and the light emission unit is controlled to emit light in a predetermined method, when a predetermined operation is performed on the printer apparatus based on the predetermined operation, so that a second screen different from the first screen is displayed and so that a state of the light emission unit is changed, wherein the control unit is configured to control the light emission unit, so that the light emission unit returns to a state in which the light emission unit emits a first light emission pattern, based on a fact that a carriage provided on the storage moves to a predetermined position in a state in which the light emission unit emits a second light emission pattern.

* * * * *